United States Patent [19]

Schele

[11] Patent Number: 4,760,627
[45] Date of Patent: Aug. 2, 1988

[54] APPARATUS FOR AN OSCILLATING PINCH ROLL ASSEMBLY UTILIZED IN THE EXTRUSION OF BLOWN FILMS

[76] Inventor: Enrique Schele, Asturias 349, Santiago, Chile

[21] Appl. No.: 28,866

[22] Filed: Mar. 23, 1987

[51] Int. Cl.⁴ .................... B29C 53/20; D06C 3/06
[52] U.S. Cl. .................................. 26/87; 26/99;
226/18; 264/209.2; 264/290.2; 264/563;
425/327; 425/372
[58] Field of Search ............ 264/290.2, 288.4, 209.2,
264/563, 209.1; 425/327, 372; 26/87, 99;
226/18

[56] References Cited

U.S. PATENT DOCUMENTS

| | | | |
|---|---|---|---|
| 3,370,111 | 2/1968 | Boone | 264/290.2 |
| 3,491,185 | 1/1970 | Rasmussen | 264/288.4 |
| 3,492,693 | 2/1970 | Clarke et al. | 264/209.2 |
| 3,576,935 | 4/1971 | Dyer et al. | 264/563 |
| 3,632,265 | 1/1971 | Upmeier | 425/326 |
| 3,657,974 | 4/1972 | Hedrich et al. | 93/1 R |
| 3,768,949 | 10/1973 | Upmeier | 425/392 |
| 3,804,571 | 4/1974 | Upmeier | 425/326 |
| 3,860,380 | 1/1975 | Upmeier | 425/326 B |
| 3,989,785 | 11/1976 | Bridge | 264/95 |
| 4,112,034 | 9/1978 | Nash et al. | 264/95 |
| 4,178,147 | 12/1979 | Hayashi | 425/372 |
| 4,339,403 | 7/1982 | Upmeier et al. | 264/40.1 |
| 4,351,785 | 9/1982 | Upmeier et al. | 264/40.1 |
| 4,425,290 | 1/1984 | Upmeier | 264/40.1 |
| 4,464,318 | 8/1984 | Upmeier et al. | 264/40.1 |
| 4,676,728 | 6/1987 | Planeta | 264/209.2 |

Primary Examiner—Jay H. Woo
Assistant Examiner—C. Scott Bushey
Attorney, Agent, or Firm—John Cyril Malloy

[57] ABSTRACT

In one embodiment, the oscillating pinch roll assembly or web handling apparatus includes a rotatable spindle having an input which accepts the tubular web. A pinch roller is mounted at the input. A plurality of rollers are circumferentially disposed around the pinch roller and the axis of rotation of those rollers is parallel to the center line of the tubular web. A turning bar is disposed in the interior of the spindle and turns the flattened web exiting the pinch rollers 90 degrees and feeds the horizontal web to a first roller of the plurality of rollers disposed at the periphery of the spindle. The traveling web always passes over this first roller. By rotating the spindle in an oscillatory manner about the center axis of the tubular web, the horizontally traveling, flat web is wound and unwound around the outer periphery of the spindle and is fed to a fixed idler roller.

16 Claims, 4 Drawing Sheets

FROM EXTRUDER 42

TO TENSION MECHANISM AND WINDER 84

APPARATUS FOR AN OSCILLATING PINCH ROLL ASSEMBLY UTILIZED IN THE EXTRUSION OF BLOWN FILMS

BACKGROUND OF THE INVENTION

The present invention relates to a web handling apparatus and particularly relates to an oscillating pinch roll assembly utilized in conjunction with the extrusion of blown plastic films.

In the production of plastic films, the roll formation or the characteristic shape of a cylindrical roll of the film is a very important characteristic indicative of the overall quality of the film. This is especially true with soft and light gauge films that are commercially sold in a roll form.

A perfect or near perfect cylindrically shaped roll is a mandatory requirement for many plastic film applications and uses. A perfect cylindrical shaped roll implies a perfect uniform gauge across the plastic film or web. This uniform gauge is very difficult to obtain in films made by a casting or made by a calendering process. In the extrusion of plastic films, it is virtually impossible to obtain a uniform film gauge that will, in turn, produce a uniform, cylindrical roll. This is especially true due to the nature of the gauge variations in the web (i.e., the film) which are very localized in the cross machine direction. In other words, one can identify narrow sections in the thickness or gauge of the film approaching or exceeding the high gauge tolerance as well as web sections approaching or exceeding the low gauge tolerances of the film. In commercially sized, cylindrical rolls that normally include thousands of layers of film, these high and low gauge sections add up algebraically thereby deforming the outer contour of the cylindrical roll; hence, "high bands" and "valleys" are readily identified in the roll. This condition affects the flatness of the web when the film is unrolled.

The introduction of extrusion blown films, where a thin wall tubing is formed by extension, improved the production of cylindrical rolls of film having "good" profiles, that is perfect or nearly perfect cylindrical shapes, without "bands" and "valleys". Production of these good profile rolls was possible by distributing the gauge tolerances laterally across the roll or laterally distributing the imperfection along a longitudinal run of the web.

In this process of extruding blown films, most of the gauge variations originate between the extruder die and the "frostline", which is an area approximately located near where the plastic bubble becomes cylindrical. In general, plastic is extruded through a generally circular die and an area of high air pressure is maintained in the "bubble" of plastic. The plastic is drawn up from the extruder by a pinch roller mechanism and the air pressure in the bubble is maintained constant. The extruded bubble of plastic is formed into a tubular web and the tubular web is drawn between two pinch rolls to obtain the double walled, lay flat.

After the tubular web or tip of the bubble is collapsed and flattened, the resulting double walled web can be wound as a "lay flat", can be slit on both edges and wound on two rolls each carrying a single layer of film, or can be slit at one point and then opened to obtain one single layer roll having a width double that of the lay flat.

In a simple extrusion blown film assembly, any particular longitudinal line on the plastic bubble remains in the same lateral location on the finished roll of film as it was in the original tubular web. This longitudinal imperfection or defect produces a bad or uneven cylindrical roll due to the cumulative effect of this gauge variation.

By rotating the pinch rolls in a plane normal to the center line of the bubble (or tubular web) and about an axis that is conjointly the center line of the tubular web, the constant, longitudinal, imperfect gauge variation line in the bubble will change its relative position across the lateral width of the roll of film. If the pinch rolls are rotated slowly and at a uniform rate through a 360 degree angle, each and every line or imperfection in the bubble traverses the full lateral width of the web. This produces an even distribution of any imperfections in the film gauge across the web. For simplicity of power transmission, by reversing the rotation of the pinch rolls and counter rotating them 360 degrees in the opposite direction, in the same slow and uniform rate, the imperfections are further laterally distributed over the longitudinal run of the web. Therefore, by introducing an oscillatory rotation of the pinch rollers with respect to the bubble center line, any imperfections can be laterally distributed along the width of the cylindrical roll. Hence, a perfect cylindrical roll film is wound regardless of the gauge variations in the tubular web. The same result can be obtained by rotating the bubble and keeping the pinch rollers stationary.

From the early stages of development of this blown film extrusion process, this technique of rotating the pinch rollers with respect to the center line of the bubble, has been applied in many different ways to obtain the lateral distribution of film gauge variations over a longitudinal run of the film. For example, the winder and the pinch rolls have been oscillated about the bubble center line when the extruder is stationary, with the winder or the extruder on the vertically upper top of the extrusion apparatus. Another method is to rotate the extruder about the extrusion or bubble center line while keeping the pinch rollers and winder stationary. Vertical extruders mounted on a rotating base were developed to save floor space in the manufacturing facility. Also, rotational dies have been widely used to generate a rotation between the pinch rollers and the tubular web.

Most recently, wider films have been required by industry which in turn dictate the use of larger equipment. Further, with the introduction of co-extrusion processes that use more than one extruder and the need to extrude polymers having poor heat stability, it is more and more difficult to use the conventional methods of rotating the extruder or rotating the winder with pinch rolls attached, or otherwise rotating the die and the air ring in order to obtain a good or nearly perfect cylindrically finished roll.

One device was developed in which a stationary extruder, die and winder were used with only the pinch rollers being oscillated about the bubble center line. An idler roller was mounted with the pinch rollers parallel to the pinch rollers and positioned outwardly and slightly higher than the pinch rollers. A turn bar was horizontally located near and rotatable about the extrusion or bubble center line. This turn bar oscillated at one-half the angular speed of the pinch rolls. The trajectory of the lay flat over this idler roll and turn bar made a 180 degree turn. As a result, the output path of the web was stabilized by fixing it over one stationary idler roller and bringing the web down from the tower (upon which was located the pinch rollers and web handler) to the stationary winder. The oscillation of the pinch rollers was 180 degrees and this technique produced good results with a reasonably good gauge control.

This principle was used in a double version with two idler rollers and two turn bars in U.S. Pat. No. 3,768,949 such that the oscillation could be extended through a 360 degree angle.

Another patent, U.S. Pat. No. 3,657,974 by Hedrich, et al., discloses the use of a pinch roller mechanism having a turn bar coplanarly turning the flattened web and two deflecting rollers at one axial end of the turn bar. The axis of rotation of this pair of deflecting rollers is parallel to the center axis of the tubular web. A third withholding roller, having an axis of rotation parallel to the tubular web center axis, is disposed at the other axial end of the turn bar. The flattened and turned web runs between the first pair of deflecting rollers, over one roller of that pair of deflecting rollers and to a fixed deflecting roller. The pinch rollers, turning bar and three deflecting rollers are rotated 360 degrees such that the web still passes between the pair of deflecting rollers, but then passes over the other pair of deflecting rollers and is spaced from the turn bar by the third deflecting roller at the other axial end of the turning bar. The unsupported distance transversed by the web is significant, i.e., the distance between the pair of deflecting rollers and the stationary idler roller. Further if the oscillatory motion is at a constant speed, change in the speed of the web will not be constant because of the straight line distance between the pair of deflecting rollers and the fixed roller varies disproportionately as compared to the oscillatory speed.

OBJECTS OF THE INVENTION

It is an object of the present invention to provide a web handling apparatus which always feeds the traveling web to a fixed idler roller.

It is a further object of the present invention to wind and unwind the horizontally traveling web around a spindle of rollers thereby periodically causing the web to travel over all of the rollers.

It is another object of the present invention to correct for the sag of the vertically positioned, and horizontally traveling web by askewing the rotational axis of the rollers along the periphery of a spindle mechanism.

It is an additional object of the present invention to automatically correct for the sag in the horizontally traveling web with a sag control and an askewing control for the rollers.

SUMMARY OF THE INVENTION

In one embodiment, the oscillating pinch roll assembly or web handling apparatus includes a rotatable spindle having an input which accepts the tubular web from the extruder. A pinch roller is mounted at the input of the spindle which pulls the web into the spindle. A plurality of rollers are circumferentially disposed around the pinch roller and the axis of rotation of those rollers is parallel to the center line of the tubular web. A turning bar is disposed in the interior of the spindle and turns the flattened web exiting the pinch rollers 90 degrees and feeds the horizontal traveling web to a first roller of the plurality of rollers disposed at the periphery of the spindle. The traveling web always passes over this first roller. By rotating the spindle in an oscillatory manner about the center axis of the tubular web, the horizontally traveling, flat web is wound and unwound around the outer periphery of the spindle and is fed continuously to a fixed position that is occupied by an idler roller.

Means is provided for askewing the plurality of rollers such that their axis of rotation is not perfectly parallel to the center line of the tubular web. The axis rotation of the rollers is changed such that an upward force is imparted to the web traveling over the rollers and hence any sag between rollers is compensated for.

BRIEF DESCRIPTION OF THE DRAWINGS

Further objects and advantages of the present invention can be found in the detailed description which follows when taken in conjunction with the accompanying drawings in which.

DETAILED DESCRIPTION OF THE INVENTION

The present invention relates to an oscillating pinch roll assembly utilized in conjunction with the extrusion of blown films and a method of handling the tubular web obtained from that extrusion process.

Figure 1:
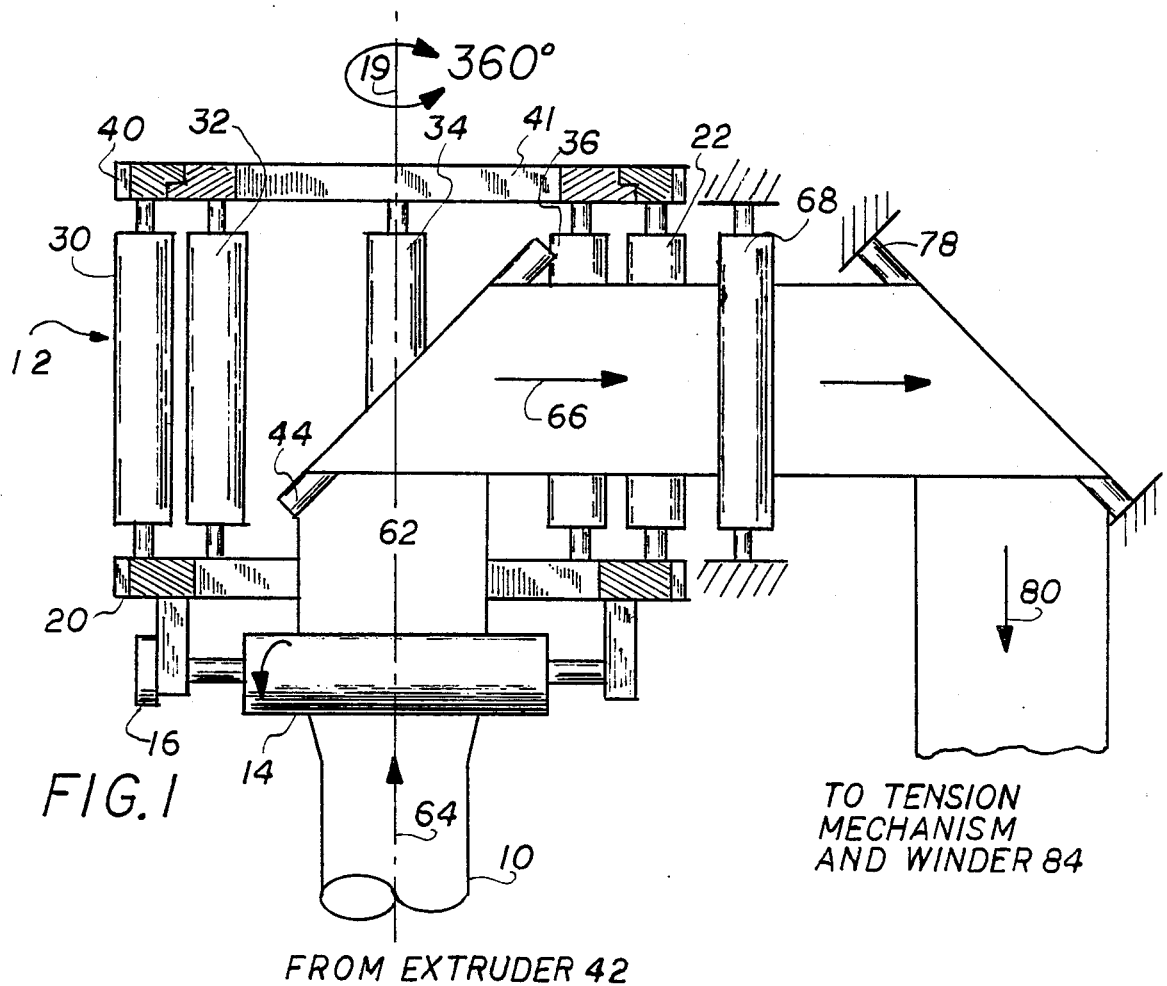
FIG. 1 illustrates, in schematic form, the web handling apparatus in accordance with the principles of the present invention.
Figure 2A:
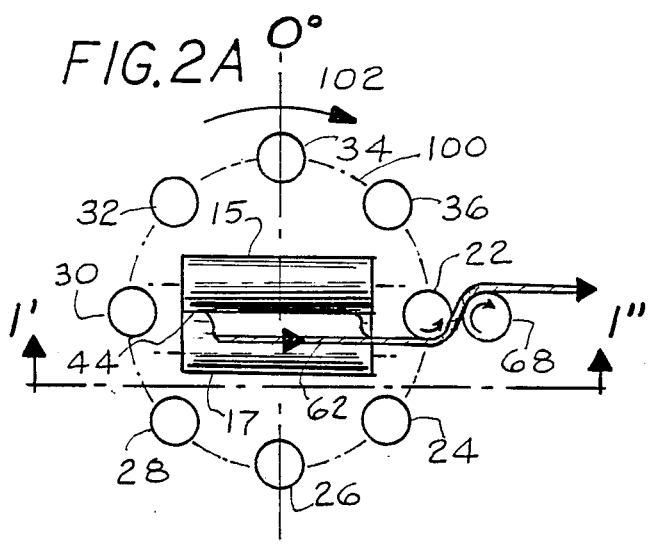
FIGS. 2A through 2F schematically illustrate the various rotational positions of the spindle in accordance with the principles of the present invention, i.e., showing the winding and unwinding aspect of the invention.
Figure 2B:
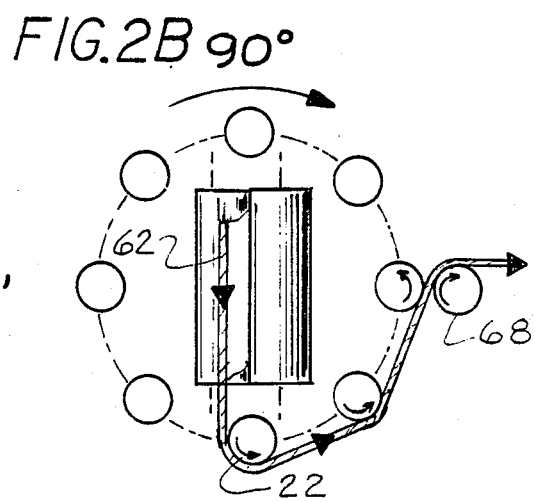
Figure 2C:
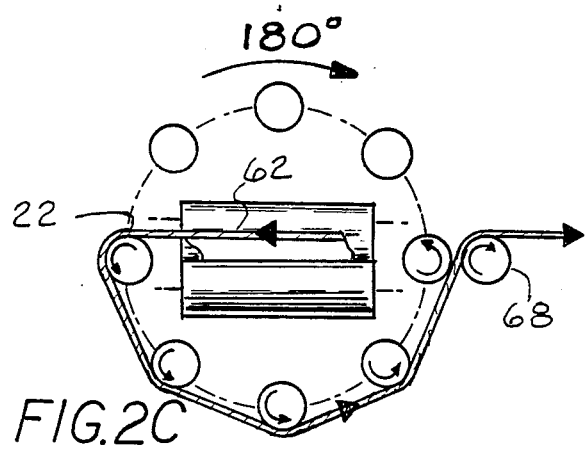
Figure 2D:
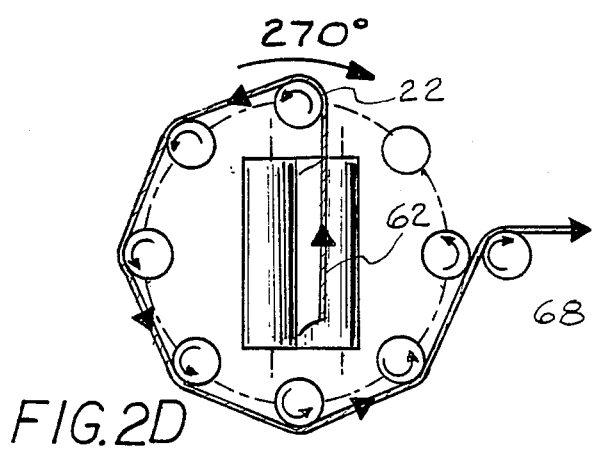
Figure 2E:
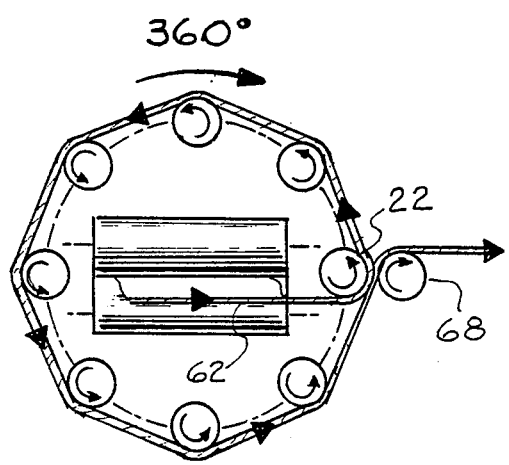

FIG. 1 is a schematic side view of the apparatus generally from the perspective section line 1'—1" in FIG. 2A. Tubular web 10 is pulled into a rotatable spindle structure 12 by pinch rollers 14. The pinch rollers are comprised of rollers 15 and 17 best illustrated in FIG. 2A. These pinch rollers are driven by motor 16 which is also mounted on spindle 12. The axis of rotation of rollers 15 and 17 is normal to the center line of tubular web 10, that center line shown as imaginary line 19 in FIG. 1.

Spindle 12 is generally defined by lower circular support structure 20, a plurality of rollers 22, 24, 26, 28, 30, 32, 34 and 36 and upper circular support structure 40 that mates with the peripheral edge of circular support structure 41. Support structures 20, 40 and 41 are rotatably mounted by an appropriate means to a frame or other structure which, in this embodiment, is vertically atop a bubble extruder 42. For a general description of such a bubble extruder, reference is made herein to U.S. Pat. No. 3,657,974 to Hedrich, et al., and that disclosure is incorporated herein by reference thereto.

A turning bar 44 is mounted in the interior of spindle 12 and affixed to frame 46. Frame 46 is attached to lower support structure 20 and to the upper, inner support structure 41, in FIG. 5.

Turning bar 44 is disposed in the plane of the flattened web 62 (the double walled film or web obtained by flattening tubular web 10 by pinch rollers 14). The bar coplanarly turns flattened web 62 substantially 90 degrees as shown by comparison of arrows 64 and 66. After being turned 90 degrees, in this embodiment to a horizontal position, web 62 travels over roller 22 and then travels over fixed roller 68. Roller 68 is not part of the rotatable spindle 12 since it is attached to the stationary frame structure shown in broken away cross-section in FIG. 1.

After leaving stationary roller 68, edge sensor 74 detects the sag of the horizontally traveling web and sag control 470 produces a signal which is fed back into askew control mechanism described later with respect to FIG. 4.

Figures 4, 5:
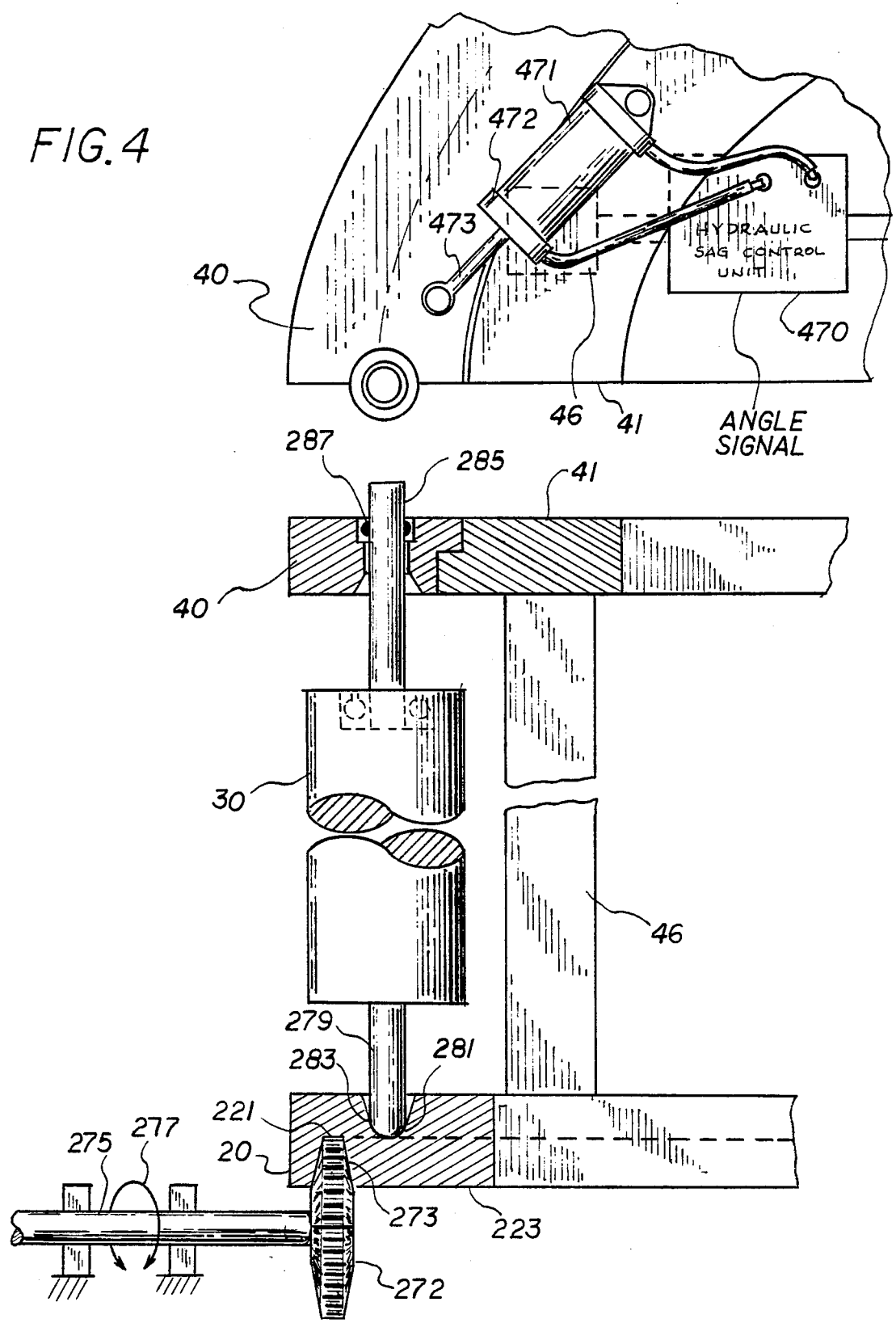
FIG. 4 is a partial schematic of the automatic askew control that askews the rollers.
FIG. 5 shows an embodiment of an oscillatory drive mechanism.

FIG. 5 shows a partial, plan view of a mechanism for imparting oscillatory motion to upper outer, upper inner and lower support structures 40, 41 and 20. Lower support structure 20 has a tapered groove 221 downwardly open on its bottom surface 223. A driving wheel 272 has a tapered edge 273 that mates with groove 221. Wheel 272 is connected to shaft 275 that rotates in two directions as shown by double-headed arrow 277. Roller 30 is mounted on roller shaft 279. The lower section 281 of the shaft is held in cavity 283. The upper section 285 is retained by a self-aligning axial bearing 287. Lower support structure 20 is also supported by two idler wheels, not shown, such that all of the wheels (the drive and idler) are 120° apart.

Web 62 traveling in direction 66 then passes over stationary turning bar 78 and is again turned 90 degrees such that it moves downward in direction 80 towards tension mechanism and winder means 84. The tensioning mechanism although not shown could be a dancer roll within the tension mechanism winder means 84 which is simply the winder upon which the finished cylindrical roll is formed.

The operation of the web handling device is described in conjunction with FIGS. 2A through 2F along with FIG. 1. The extruded film bubble is pulled from extruder 42 by pinch rollers 14. Tubular web 10 is flattened and becomes a double walled flattened web 62 which is then turned over turning bar 44. Web 62 then travels over roller 22. Rollers 22, 24, 26, 28, 30, 32, 34 and 36 can be driven rollers or idler rollers. The diameter of the circle passing through the axis of rotation of these rollers is slightly larger than the length of the pinch rollers 14. The length of these external rollers that define the outer periphery of spindle 12 is equal to the diameter of the circle. In general, this circle is circle 100 in FIG. 2A.

Figure 2F:
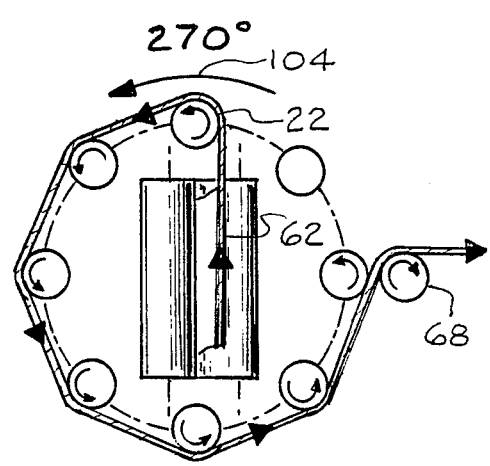

Spindle 12 can be thought of as a spool which winds and unwinds flattened web 62 about its outer periphery. FIG. 2A shows the 0 degree angular position wherein roller 22 is closely spaced from fixed roller 68. At a minimum, spool 12 must include roller 22 and roller 30 at diametrically opposing positions on the spindle. Spindle 12 slowly rotates clockwise in direction 102 as shown in FIGS. 2B through 2E. Those figures show sequentially the 90 degree position, 180 degree position, 270 degree position and 360 degree position. It can be seen that pinch rollers 14 and turning bar 44 rotate about center line 19 of tubular web 10. After rotating through the predetermined 360 degree angle shown in FIG. 2E, the spindle mechanism is counter rotated as shown in FIG. 2F, counter clockwise or in direction 104 and web 62 is unwound from spindle 12.

At all times, web 62 leaves stationary roller 68 at the same position and in the same direction. This direction is immediately to the right of stationary roller 68 as shown in FIGS. 2A through 2F. The web can alternatively travel along path 106 as shown by the dash lines in FIG. 2C. In either case, the web travels in the same direction. Also, it can be seen that web 62 always travels over the first roller 22 that defines a portion of the periphery of spindle 12 and further periodically travels over all other rollers mounted on the spindle. The rollers always turn in the same direction notwithstanding the winding and unwinding direction of the spindle in general.

The oscillation of the spindle is very slow as compared with the speed of travel of web 62. For example, a speed of 0.04–0.08 RPM is not uncommon for the spindle. Since the distance the flattened web must travel increases and decreases dependent upon the winding or unwinding position of the spindle, the change in web speed is almost constant. Tensioning mechanism 82 is downstream of the web handling apparatus. That tensioning mechanism affects the take-up winder speed or velocity as well as the tension of the web coming off of the spindle and associated structures. Further, the increase and decrease in speed is minimal as compared with the traveling speed of the web.

By increasing number of rollers defining the outer periphery of the spool, the distance the web has to travel between each roller is smaller and also the oscillatory action of the spindle on the web is more uniform. The distance between the rollers is a factor since this distance represents an unsupported length of web.

Since the web is traveling horizontally and in a vertical position, there is a tendency for the web to move downward over the rollers. Two main factors affect this downward movement, the slippage between the surface of the roller and the plastic film or web and the sagging of the web, being in both cases a function of the characteristic of the web itself and the tension applied to it.

The tension on the web is adjustable and an optimum amount is applied for proper operation of the web handling apparatus by tension mechanism 82 identified in FIG. 1. Rollers 22, 24, 26, 28, 30, 32, 34, 36, and 68 can be coated with rubber or other elastomer with a high coefficient of friction. In this manner, no slippage occurs between the rollers and the web. If eight rollers are used, the effect of sagging is relatively minor due to the small distance between the rollers. However, the effect of any sagging can be completely eliminated or nullified by tilting or askewing the axis of the rollers from the line parallel to the center line of the tubular web (center line 19 in FIG. 1).

Figure 3:
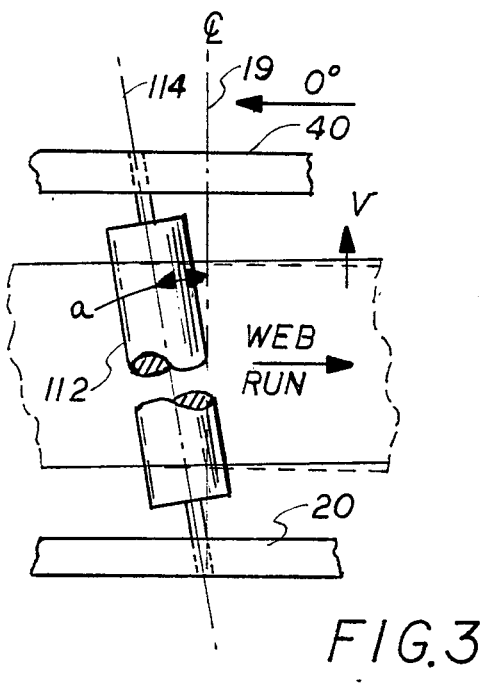
FIG. 3 shows a partial schematic view of the web traveling over a roller wherein the axis of rotation of the roller is askewed from a line that is parallel to the center line of the tubular web.

FIG. 3 details this tilting or askewing. Center line 19 is parallel to the center line of the tubular web. The upper support 40 and lower support structure 20 is shown in the figure. By rotating upper support 40 a predetermined number of degrees with respect to lower support structure 20, the axis of rotation of roller 112 is changed to center line 114. Specifically, an angle exists between parallel center line 19 and current position center line 114. When the roller is aligned with parallel center line 19, the web travels normal to that axis of rotation as shown by the dash lines in FIG. 3. However, when roller 112 has an axially center line 114, the web experiences an upward movement because the web attempts to travel in a line normal to the axis of rotation of that roller. This is shown in the solid lines representing the web in FIG. 3. By rotating upper support structure 40 with respect to lower support structure 20, all of the rollers are askewed or tilted in the same degree and any sagging occurring in the horizontally traveling web is eliminated. This sag compensation is proportional about the periphery of the spindle.

Figure 6:
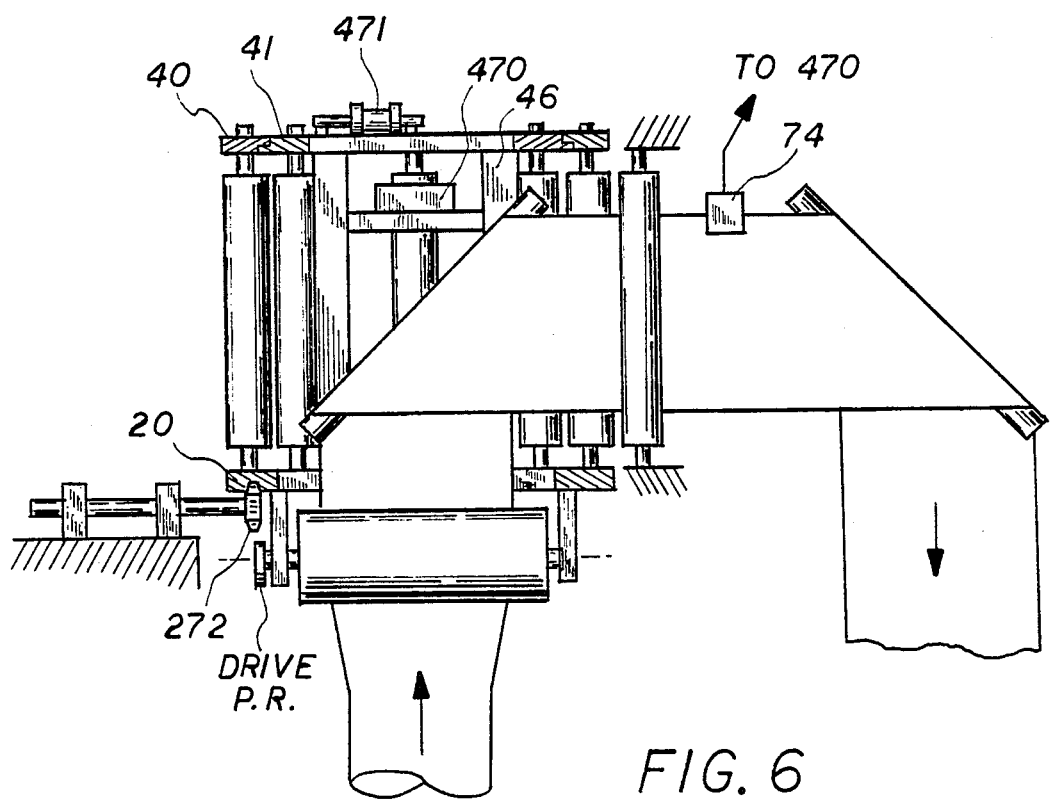
FIG. 6 illustrates a plan view showing placement of the askew control and the oscillatory drive; and, FIG. 7 illustrates a top, plan view of the upper support structures.

The sagging can be automatically adjusted utilizing edge detector 74 and sag control 470 shown in FIG. 6. The sag control produces an angle signal that is applied to a device shown in detail in FIG. 4. The sag control signal is applied to hydraulic sag control unit 470. Rod 473 is connected to outer, upper support structure 40 whereas cylinder 471 is connected to inner, upper support structure 41. The hydraulic actuator is a two cylinder device operable in opposing directions, i.e., the cylinders are in series.

FIG. 6 shows a plan view of hydraulic cylinder 471 atop support 41 and oscillatory drive wheel 272 below support 20.

Figure 7:
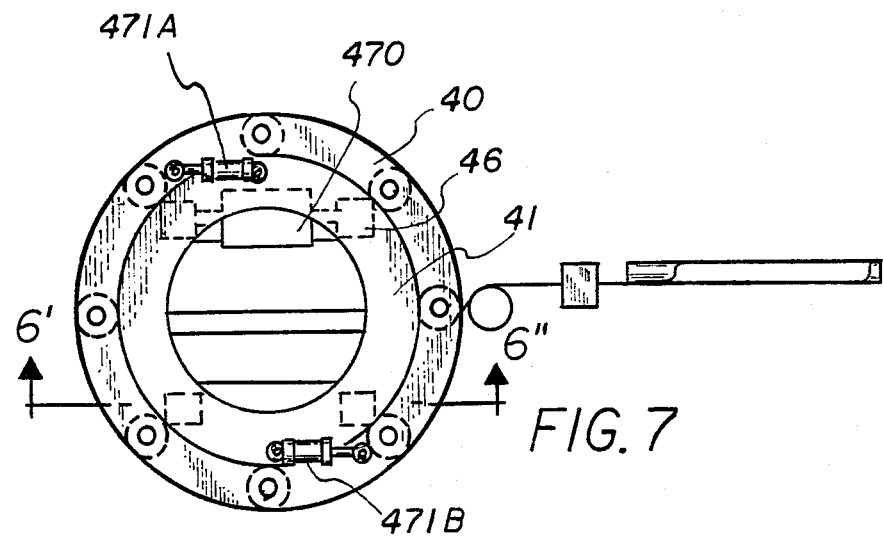

FIG. 7 shows a top view with cylinders 471A and 471B operable to control the askew of each roller that is shown by dashed lines.

By changing the axis of rotation and askewing that axis from a line parallel to the center line of the tubular web, a proportional correction for the sag is achieved.

Of course, other mechanisms may be employed to achieve the tilting or askewing of the rollers that define the periphery of spindle 12.

The blown film extrusion process is done at a constant speed. The lineal speed of the bubble, surface speed of the pinch rollers and the speed of lay flat traveling through the assembly and over the rollers defining the spindle is constant in relation to the assembly. Once the lay flat contacts stationary or fixed roller 68 and from that point on downstream the web's lineal speed with respect to a fixed point in the extrusion assembly becomes cyclical due to the retardation and acceleration caused by the wrapping and the unwrapping action of the spindle. The variations of the lay flat speed are very small as a percentage of the total speed of the lay flat and this does not cause problems inasmuch as the downstream component units in the film line are driven at a constant tension rather than a constant speed.

The claims appended hereto are meant to cover modifications and changes within the scope and spirit of the present invention. For example, the number of rollers defining the outer periphery of the spindle can be changed. The driving mechanisms of the spindle and of the pinch rollers can be altered. The edge sensor, the sag control and askew or tilting control can be modified and can be moved to any particular location that may provide an indication of sag of the horizontally traveling web. Also, the spindle need not be vertically aligned, but must be aligned with the center line of the tubular web. If the tubular web is running horizontally, then the axial center line of the spindle must be horizontal and the flattened web would travel circumferentially about that horizontal axis. In that case, the sag control mechanism may not be necessary.

What I claim is:

1. A web handling apparatus for flattening and laterally distributing any longitudinal imperfections in a moving continuous, flexible, tubular web comprising:
   a rotatable spindle having an input accepting said tubular web, said tubular web having said longitudinal imperfections at a constant circumferential position, and outputting a flattened web with said imperfections laterally distributed to a fixed idler roller, said spindle including:
   a pinch roller means for flattening said tubular web disposed at the input of said spindle;
   a turning bar means mounted coplanar with said flattened web as said web exits said pinch roller means, said turning bar means for coplanarly turning said web substantially 90 degrees;
   a plurality of rollers circumferentially disposed about said turning bar means having axes of rotation substantially parallel to an axis of rotation of said spindle and substantially laterally aligned with said flattened web, said flattened web always traveling first over a first roller of said plurality of rollers and periodically traveling over one or more other rollers of said plurality of rollers along an outer periphery of said spindle, that is defined by a plurality of idler rollers, to said fixed idler roller; and,
   means for rotating said spindle through a predetermined angle of 360° about an axis of said tubular web such that a relative position of said imperfection with respect to a defined position on said turning bar means changes thereby laterally distributing said imperfection along a longitudinal run of said flattened web.

2. A web handling apparatus as claimed in claim 1 wherein said means for rotating is an oscillatory rotation means that rotates said spindle through said predetermined angle and then counter rotates said spindle through said predetermined angle in an opposite rotational direction, thereby periodically causing said flattened web to travel over said other rollers.

3. A web handling apparatus for flattening and laterally distributing any longitudinal imperfections in a moving continuous, flexible, tubular web comprising:
   a rotatable spindle having an input accepting said tubular web, said tubular web having said longitudinal imperfections at a constant circumferential position, and outputting a flattened web with said imperfections laterally distributed to fixed idler roller, said spindle including:
   a pinch roller means for flattening said tubular web disposed at the input of said spindle;
   a turning bar means mounted coplanar with said flattened web as said web exits said pinch roller means, said turning bar means for coplanarly turning said web substantially 90 degrees;
   a plurality of rollers circumferentially disposed about said turning bar means having axes of rotation substantially parallel to an axis of rotation of said spindle and substantially laterally aligned with said flattened web, said flattened web always traveling first over a first roller of said plurality of rollers and periodically traveling over one or more other rollers of said plurality of rollers along an outer periphery of said spindle, that is defined by a plurality of idler rollers, to said fixed idler roller;
   means for rotating said spindle through a predetermined angle of 360°;
   said means for rotating comprising an oscillatory rotation means that rotates said spindle through said predetermined angle in an opposite rotational direction, thereby periodically causing said flattened web to travel over said other rollers;
   said tubular web being vertically pulled into said spindle via said pinch roller means, said spindle and the axes of said plurality of rollers being vertically disposed, said spindle including two end support structures that rotationally support said plurality of rollers, one end support structure having said pinch roller means mounted thereto and said turning bar means mounted thereto; and means for askewing the axes of rotation of said plurality of rollers by rotating said one end support structure with respect to the other end support structure such that said flattened web moving over said plurality of rollers is caused to move upward due to the askewed axes of rotation of said plurality of rollers to counteract any sag in a horizontally moving flattened web.

4. A web handling apparatus as claimed in claim 3 including an edge detecting means for monitoring a horizontal position of a horizontally disposed and flattened web and for generating a sag signal when an edge of said horizontal and flattened web is outside a predetermined vertical range, means for controlling the askew of said axes of rotation of said plurality of rollers via said means for askewing such that an upward movement is imparted to said horizontal and flattened web thereby automatically counteracting said sag.

5. A take off apparatus for blown plastic tubing, rotatable through 360 degrees and reversible about a tubing center line, comprising a rotating structure including: two pull rolls and a canopy for flattening said tubing, a 45 degree turn bar following said pull rolls on a plane parallel to said pull rolls and centrally and tangentially located to said center line, multiple and equally spaced rollers surrounding said turn bar and mounted in a circumferential pattern concentric with said center line, said rollers having axes of rotation mostly parallel to said center line, one of said rollers being located substantially in line with said turn bar; said rotating structure being operated upon by means for imparting an oscillatory rotation to said rotating structure about said center line; a stationary roller closely located proximate to the circle of rollers and parallel to said center line, said flattened tube comprising said web and the web after traveling over the turn bar and an exterior of the circle of rollers, is wrapped 360 degrees and unwrapped over said rollers by the oscillatory rotation of the rotating structure in conjunction with the stationary roller, said wrapping and unwrapping action being characterized by a rotation of the rollers always being in a same direction when said rollers are in contact with said web, said apparatus including a minimum of two rollers that are external and parallel to said center line and are in line with said turn bar, said apparatus including an external circle of rollers which are parallel to said center line and comprise idler rollers or driven rollers; and the axes of the external oscillating rollers being at an angle with respect to said center line such that a lifting effect is produced on said web as said web passes over said rollers thereby nullifying any sagging of said web.

6. An apparatus according to claim 5 in which the axes of the external, oscillating rollers is adjusted by means for continually and automatically adjusting with respect to said center line while the apparatus is in operation such that said rollers act as an edge guide for said web.

7. A web handling apparatus for flattening and laterally distributing any longitudinal imperfections in a moving continuous, flexible, tubular web comprising:

a rotatable spindle having an input accepting said tubular web, said tubular web having said longitudinal imperfections at a constant circumferential position, and outputting a flattened web with said imperfections laterally distributed to a fixed idler roller, said spindle including:

a pinch roller means for flattening said tubular web disposed at the input of said spindle;

a turning bar means mounted coplanar with said flattened web as said web exits said pinch roller means, said turning bar means for coplanarly turning said web substantially 90 degrees;

a plurality of rollers circumferentially disposed about said turning bar means having axes of rotation substantially parallel to an axis of rotation of said spindle and substantially laterally aligned with said flattened web, said flattened web always traveling first over a first roller of said plurality of rollers and periodically traveling over one or more other rollers of said plurality of rollers along an outer periphery of said spindle, that is defined by a plurality of idler rollers, to said fixed idler roller;

means for rotating said spindle about an axis of said tubular web such that a relative position of said imperfection with respect to a defined position on said turning bar means changes thereby laterally distributing said imperfection along longitudinal run of said flattened web;

said means for rotating comprising an oscillatory rotation means that rotates said spindle through a predetermined angle of 360 degrees and then counter rotates said spindle through said predetermined angle in an opposite rotational direction, thereby periodically causing said flattened web to travel over said other rollers;

said tubular web being vertically pulled into said spindle via said pinch roller means, said spindle and the axes of said plurality of rollers being vertically disposed; and means for askewing the axes of rotation of said plurality of rollers such that said flattened web moving over said plurality of rollers is caused to move upward due to an askewed axes of rotation of said plurality of rollers to counteract any sag in a horizontally moving flattened web.

8. A web handling apparatus for flattening and laterally distributing any longitudinal imperfections in a moving continuous, flexible, tubular web comprising:

a rotatable spindle having an input accepting said tubular web, said tubular web having said longitudinal imperfections at a constant circumferential position, and outputting a flattened web with said imperfections laterally distributed to a fixed idler roller, said spindle including:

a pinch roller means for flattening said tubular web disposed at the input of said spindle;

a turning bar means mounted coplanar with said flattened web as said web exits said pinch roller means, said turning bar means for coplanarly turning said web substantially 90 degrees;

a plurality of rollers circumferentially disposed about said turning bar means having axes of rotation substantially parallel to an axis of rotation of said spindle and substantially laterally aligned with said flattened web, said flattened web always traveling first over a first roller of said plurality of rollers and periodically traveling over one or more other rollers of said plurality of rollers along an outer periphery of said spindle, that is defined by a plurality of idler rollers, to said fixed idler roller;

means for rotating said spindle about an axis of said tubular web such that a relative position of said imperfection with respect to a defined position on said turning bar means changes thereby laterally distributing said imperfection along longitudinal run of said flattened web;

said means for rotating comprising an oscillatory rotation means that rotates said spindle through a predetermined angle of 360 degrees and then counter rotates said spindle through said predetermined angle in an opposite rotational direction, thereby periodically causing said flattened web to travel over said other rollers;

said tubular web being vertically pulled into said spindle via said pinch roller means, said spindle and the axes of said plurality of rollers being vertically disposed;

means for askewing the axes of rotation of said plurality of rollers such that said flattened web moving over said plurality of rollers is caused to move upward due to an askewed axes of rotation of said plurality of rollers to counteract any sag in a horizontally moving flattened web; and said apparatus including a pinch roller drive means mounted on said spindle for drawing said tubular web into said spindle.

9. A web handling apparatus for flattening and laterally distributing any longitudinal imperfections in a moving continuous, flexible, tubular web comprising:

a rotatable spindle having an input accepting said tubular web, said tubular web having said longitudinal imperfections at a constant circumferential position, and outputting a flattened web with said imperfections laterally distributed to a fixed idler roller, said spindle including:

a pinch roller means for flattening said tubular web disposed at the input of said spindle;

a turning bar means mounted coplanar with said flattened web as said web exits said pinch roller means, said turning bar means for coplanarly turning said web substantially 90 degrees;

a plurality of rollers circumferentially disposed about said turning bar means having axes of rotation substantially parallel to an axis of rotation of said spindle and substantially laterally aligned with said flattened web, said flattened web always traveling first over a first roller of said plurality of rollers and periodically traveling over one or more other rollers of said plurality of rollers along an outer periphery of said spindle, that is defined by a plurality of idler rollers, to said fixed idler roller;

means for rotating said spindle about an axis of said tubular web such that a relative position of said imperfection with respect to a defined position on said turning bar means changes thereby laterally distributing said imperfection along longitudinal run of said flattened web;

said means for rotating comprising an oscillatory rotation means that rotates said spindle through a predetermined angle of 360 degrees and then counter rotates said spindle through said predetermined angle in an opposite rotational direction, thereby periodically causing said flattened web to travel over said other rollers;

said tubular web being vertically pulled into said spindle via said pinch roller means, said spindle and the axes of said plurality of rollers being vertically disposed;

means for askewing the axes of rotation of said plurality of rollers such that said flattened web moving over said plurality of rollers is caused to move upward due to an askewed axes of rotation of said plurality of rollers to counteract any sag in a horizontally moving flattened web;

said apparatus including a pinch roller drive means mounted on said spindle for drawing said tubular web into said spindle;

said turning bar means being mounted in the interior of said spindle.

10. A take off apparatus for blown plastic tubing, rotatable through 360 degrees and reversible about a tubing center line, comprising a rotating structure including: two pull rolls and a canopy for flattening said tubing, a 45 degree turn bar following said pull rolls on a plane parallel to said pull rolls and centrally and tangentially located to said center line, multiple and equally spaced rollers surrounding said turn bar and mounted in a circumferential pattern concentric with said center line, said rollers having axes of rotation mostly parallel to said center line, one of said rollers being located substantially in line with said turn bar; said rotating structure being operated upon by means for imparting an oscillatory rotation to said rotating structure about said center line; a stationary roller closely located proximate to the circle of rollers and parallel to said center line.

11. An apparatus according to claim 10 wherein the flattened tubing is a web and the web after traveling over the turn bar and an exterior of the circle of rollers, is wrapped and unwrapped over said rollers by the oscillatory rotation of the rotating structure in conjunction with the stationary roller.

12. An apparatus according to claim 11 wherein the wrapping and unwrapping action is characterized by a rotation of the rollers always being in a same direction when said rollers are in contact with said web.

13. A take off apparatus for blown plastic tubing, rotatable through 360 degrees and reversible about a tubing center line, comprising a rotating structure including:

two pull rolls and a canopy for flattening said tubing, a 45 degree turn bar following said pull rolls on a plane parallel to said pull rolls and centrally and tangentially located to said centerline, multiple and equally spaced rollers surrounding said turn bar and mounted in a circumferential pattern concentric with said centerline, said rollers having axes of rotation mostly parallel to said centerline, one of said rollers being located substantially in line with said turn bar; said rotating structure being operated upon by means for imparting an oscillatory rotation to said rotating structure about said centerline; a stationary roller closely located proximate to the circle of rollers and parallel to said centerline;

said apparatus including a minimum of two rollers, said two rollers being external and parallel to said centerline and in line with said turn bar.

14. An apparatus according to claim 13 in which an external circle of said rollers are parallel to said center line and are idler rollers or are driven rollers.

15. A take off apparatus for blown plastic tubing, rotatable through 360 degrees and reversible about a tubing centerline, comprising a rotating structure including:

two pull rolls and a canopy for flattening said tubing, a 45 degree turn bar following said pull rolls on a plane parallel to said pull rolls and centrally and tangentially located to said centerline, multiple and equally spaced rollers surrounding said turn bar and mounted in a circumferential pattern concentric with said centerline, said rollers having axes of rotation mostly parallel to said centerline, one of said rollers being located substantially in line with said turn bar; said rotating structure being operated upon by means for imparting an oscillatory rotation to said rotating structure about said centerline; a stationary roller closely located proximate to the circle of rollers and parallel to said centerline, said flattened tube comprising said web and the web after traveling over the turn bar and an exterior of the circle of rollers, is wrapped 360 degrees and unwrapped over said rollers by the oscillatory rotation of the rotating structure in conjunction with the stationary roller, said wrapping and unwrapping action being characterized by a rotation of the rollers always being in a same direction when said rollers are in contact with said web, said apparatus including a minimum of two rollers that are external and parallel to said centerline and are in line with said turn bar, said apparatus including an external circle of rollers which are parallel to said centerline and comprise idler rollers or driven rollers;

the axes of the external oscillating rollers being at an angle with respect to said centerline such that a lifting effect is produced on said web as said web passes over said rollers thereby nullifying any sagging of said web;

said external circle of rollers parallel to said centerline having a coating of rubber or elastomer with a high coefficient of friction.

16. An apparatus according to claim 15 in which the axes of the external, oscillating rollers is preset at an angle with respect to said center line such that a lifting effect is produced on a said web as said web passes over said rollers thereby nullifying the sagging of said web.

* * * * *